(12) United States Patent
Fujita et al.

(10) Patent No.: US 10,971,717 B2
(45) Date of Patent: Apr. 6, 2021

(54) POSITIVE ELECTRODE ACTIVE MATERIAL, POSITIVE ELECTRODE, AND LITHIUM ION SECONDARY BATTERY

(71) Applicant: TDK CORPORATION, Tokyo (JP)

(72) Inventors: Shin Fujita, Tokyo (JP); Hideaki Seki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 7 days.

(21) Appl. No.: 15/348,280

(22) Filed: Nov. 10, 2016

(65) Prior Publication Data

US 2017/0149051 A1 May 25, 2017

(30) Foreign Application Priority Data

Nov. 19, 2015 (JP) .............................. JP2015-226173
Sep. 1, 2016 (JP) .............................. JP2016-170528

(51) Int. Cl.
| | |
|---|---|
| *H01M 4/131* | (2010.01) |
| *H01M 10/0525* | (2010.01) |
| *H01M 4/36* | (2006.01) |
| *H01M 4/525* | (2010.01) |
| *H01M 4/62* | (2006.01) |
| *H01M 4/505* | (2010.01) |

(52) U.S. Cl.
CPC .......... *H01M 4/131* (2013.01); *H01M 4/366* (2013.01); *H01M 4/505* (2013.01); *H01M 4/525* (2013.01); *H01M 4/62* (2013.01); *H01M 4/625* (2013.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 7,838,151 | B2* | 11/2010 | Koga ...................... | H01M 4/40 |
| | | | | 429/218.1 |
| 2004/0096743 | A1 | 5/2004 | Okae et al. | |
| 2004/0258998 | A1* | 12/2004 | Vallee ................... | H01M 4/667 |
| | | | | 429/245 |
| 2005/0019666 | A1* | 1/2005 | Yasuda ................. | H01M 6/187 |
| | | | | 429/309 |
| 2006/0222953 | A1* | 10/2006 | Inoue .................... | H01M 4/131 |
| | | | | 429/232 |
| 2008/0118829 | A1* | 5/2008 | Nanno ................ | H01M 10/052 |
| | | | | 429/163 |
| 2011/0020706 | A1* | 1/2011 | Nesper ................... | H01M 4/58 |
| | | | | 429/231.8 |

(Continued)

FOREIGN PATENT DOCUMENTS

| | | | |
|---|---|---|---|
| CN | 101217195 A | * | 7/2008 |
| CN | 102891310 A | | 1/2013 |

(Continued)

*Primary Examiner* — Zhongqing Wei
(74) *Attorney, Agent, or Firm* — Oliff PLC

(57) ABSTRACT

A positive electrode active material includes: a lithium complex oxide expressed by chemical formula (1); a highly thermal conductive compound; and graphene or multilayer graphene.

$$Li_xM1_yM2_{1-y}O_2 \qquad (1)$$

In the formula (1), M1 is at least one metal selected from Ni, Co, and Mn, M2 is at least one metal selected from the group consisting of Al, Fe, Ti, Cr, Mg, Cu, Ga, Zn, Sn, B, V, Ca, and Sr, and x and y are numbers such that $0.05 \le x \le 1.2$ and $0.3 \le y \le 1$.

10 Claims, 2 Drawing Sheets

(56) References Cited

U.S. PATENT DOCUMENTS

| | | | |
|---|---|---|---|
| 2013/0052535 A1 | 2/2013 | Yanagihara et al. | |
| 2013/0084499 A1 | 4/2013 | Yanagita et al. | |
| 2013/0221283 A1 | 8/2013 | Oh et al. | |
| 2014/0295263 A1 | 10/2014 | Iwama et al. | |
| 2015/0037673 A1* | 2/2015 | Zaghib | H01M 4/136 |
| | | | 429/221 |
| 2015/0110972 A1* | 4/2015 | Chang | B05D 1/005 |
| | | | 427/565 |
| 2015/0125646 A1* | 5/2015 | Tournilhac | C09K 5/14 |
| | | | 428/36.92 |

FOREIGN PATENT DOCUMENTS

| | | |
|---|---|---|
| CN | 104078648 A | 10/2014 |
| CN | 104241615 A | 12/2014 |
| JP | 2004-087299 A | 3/2004 |
| JP | 2006-164758 A | 6/2006 |
| JP | 2007-173134 A | 7/2007 |
| JP | 2012-022888 A | 2/2012 |
| JP | 2012-234766 A | 11/2012 |
| JP | 2013-084566 A | 5/2013 |
| JP | 2014-510997 A | 5/2014 |
| WO | WO-2014127218 A1 * 8/2014 ........... C01B 32/188 |

* cited by examiner

POSITIVE ELECTRODE ACTIVE MATERIAL, POSITIVE ELECTRODE, AND LITHIUM ION SECONDARY BATTERY

CROSS-REFERENCE TO RELATED APPLICATION

This application claims priority from Japanese Patent Application Nos. 2015-226173 filed on Nov. 19, 2015 and 2016-170528 filed on Sep. 1, 2016, with the Japan Patent Office, the entire contents of which are hereby incorporated by reference.

BACKGROUND

1. Technical Field

The present disclosure relates to a positive electrode active material, a positive electrode using the same, and a lithium ion secondary battery.

2. Description of the Related Art

Conventionally, researches have been widely conducted on the use of lithium cobalt oxide, lithium nickel oxide, lithium manganese oxide and the like as the positive electrode active material for lithium ion secondary batteries, as these materials enable the generation of an electromotive force in excess of 4 V.

With regard to the positive electrode active material for lithium ion secondary batteries, there is a trend for increasing the charge voltage so as to achieve an increase in discharge capacity. However, when the discharge capacity is increased by increasing the charge voltage, the amount of heat generated by the battery also increases. The heat may degrade the cycle characteristics of the battery.

Particularly, in a battery system including lithium cobalt oxide, lithium nickel oxide, lithium manganese oxide, or the like as the positive electrode active material, sufficient cycle characteristics may not be obtained when there is a large amount of heat due to the increase in charge voltage. This problem is particularly pronounced in a high temperature environment.

The cycle characteristics of lithium cobalt oxide are described in JP-A-2006-164758, for example. The literature reports that the cycle characteristics can be increased by substituting a part of cobalt and/or lithium of the lithium cobalt oxide with other metal elements. However, the improvement in thermal instability during charging that can be achieved is not sufficient, and there is a need for a further increase in cycle characteristics. In the following, a lithium ion secondary battery may be referred to as "a battery" depending on the context.

SUMMARY

A positive electrode active material includes: a lithium complex oxide expressed by chemical formula (1); a highly thermal conductive compound; and graphene or multilayer graphene.

$$Li_xM1_yM2_{1-y}O_2 \quad (1)$$

In the formula (1), M1 is at least one metal selected from Ni, Co, and Mn, M2 is at least one metal selected from the group consisting of Al, Fe, Ti, Cr, Mg, Cu, Ga, Zn, Sn, B, V, Ca, and Sr, and x and y are numbers such that $0.05 \le x \le 1.2$ and $0.3 \le y \le 1$.

DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of the present disclosure is to provide a positive electrode active material, a positive electrode, and a lithium ion secondary battery with high cycle characteristics.

A positive electrode active material according to an embodiment of the present disclosure (the present positive electrode active material) includes: a lithium complex oxide expressed by chemical formula (1); a highly thermal conductive compound; and graphene or multilayer graphene.

$$Li_xM1_yM2_{1-y}O_2 \quad (1)$$

In the formula (1), M1 is at least one metal selected from Ni, Co, and Mn, M2 is at least one metal selected from the group consisting of Al, Fe, Ti, Cr, Mg, Cu, Ga, Zn, Sn, B, V, Ca, and Sr, and x and y are numbers such that $0.05 \le x \le 1.2$ and $0.3 \le y \le 1$.

The present positive electrode active material with the configuration includes the highly thermal conductive compound, and graphene or multilayer graphene. Accordingly, the heat generated during charging is allowed to escape efficiently. As a result, the accumulation of heat in the positive electrode can be suppressed, whereby deterioration of the present positive electrode active material can be suppressed. In this way, cycle characteristics are improved. When the charge voltage is raised to around 4.2 V, in particular, crystal transition of the positive electrode active material, or decomposition of the positive electrode active material may occur, possibly resulting in large heat generation. Such decrease in the thermal stability of the positive electrode active material can be suppressed by the present positive electrode active material having the above configuration.

In the present positive electrode active material, the highly thermal conductive compound may be at least one selected from the group consisting of AlN, BN, $Si_3N_4$, TiN, ZrN, VN, $Cr_2N$, SiC, WC, TiC, TaC, ZrC, NbC, $Mo_2C$, $Cr_3C_2$, $TiB_2$, $ZrB_2$, $VB_2$, and $NbB_2$.

According to this configuration, the present positive electrode active material particularly includes highly thermal conductive compounds. In this way, the heat generated during charging is allowed to escape efficiently. As a result, the accumulation of heat in the positive electrode can be suppressed, whereby deterioration of the present positive electrode active material can be suppressed. Accordingly, cycle characteristics are improved.

The highly thermal conductive compound (weight) used for the present positive electrode active material may have a content of 0.05 to 10 wt % with respect to the lithium complex oxide.

When the weight of the highly thermal conductive compound relative to the lithium complex oxide is more than 0.05 wt %, the heat generated during charging can escape more efficiently. As a result, cycle characteristics are improved. When the weight of the highly thermal conductive compound relative to the lithium complex oxide is not more than 10 wt %, a decrease in energy density can be suppressed.

The lithium complex oxide used in the present positive electrode active material may be coated with a coating layer; and the coating layer may include one or more of the highly thermal conductive compound, the graphene, and the multilayer graphene.

When at least a part of the lithium complex oxide is coated by the highly thermal conductive compound, the heat from a heat-generating source can be transmitted and allowed to escape more efficiently. As a result, the accumulation of heat in the positive electrode is suppressed, whereby deterioration of the present positive electrode active material is suppressed. Thus, cycle characteristics are improved.

The coating layer may include the highly thermal conductive compound, and the coating layer may be partly coated with the graphene or the multilayer graphene.

In this configuration, the coating layer can more be closely attached to the lithium complex oxide more strongly. In addition, the influence of anisotropy of thermal conductivity of the graphene or multilayer graphene can be absorbed. Accordingly, heat emitted from the lithium complex oxide can be more rapidly conducted and dissipated. As a result, accumulation of heat in the positive electrode is suppressed, whereby degradation of the present positive electrode active material is suppressed. Accordingly, cycle characteristics are increased.

In the present positive electrode active material, the highly thermal conductive compound may have an average film thickness of 30 to 300 nm, and the graphene or multilayer graphene may have a film thickness of 50 to 500 nm.

When the average film thickness of the highly thermal conductive compound is 30 nm or more, formation of a heat-conducting network path is facilitated. Accordingly, heat can be efficiently dissipated, whereby cycle characteristics are increased. When the average film thickness of the highly thermal conductive compound is not more than 300 nm, a decrease in ion conductivity can be suppressed. Accordingly, a decrease in rate performance can be suppressed.

When the film thickness of the graphene or multilayer graphene is 50 nm or more, formation of a heat-conducting network path is facilitated. Accordingly, heat can be efficiently dissipated, whereby cycle characteristics are improved. When the film thickness of the graphene or multilayer graphene is not more than 500 nm, a decrease in ion conductivity can be suppressed. Accordingly, a decrease in rate performance can be suppressed.

The highly thermal conductive compound used for the present positive electrode active material may have an average primary particle diameter of 10 to 500 nm.

When the average primary particle diameter of the highly thermal conductive compound is 10 nm or more, a thermal conduction network path can be more readily formed, enabling the heat to escape efficiently. When the average primary particle diameter of the highly thermal conductive compound is 500 nm or less, the number of points of contact between the particles can be increased, enabling the heat to escape efficiently. As a result, cycle characteristics are improved.

According to embodiments of the present disclosure, there are provided a positive electrode active material, a positive electrode using the same, and a lithium ion secondary battery which have high cycle characteristics.

An example of a preferred embodiment of the lithium ion secondary battery according to the present disclosure will be described with reference to the drawings. It should be noted, however, that the lithium ion secondary battery according to the present disclosure is not limited to the following embodiments. The dimensional ratios of the drawings are not limited to the illustrated ratios.

(Lithium Ion Secondary Battery)

Figure 1:
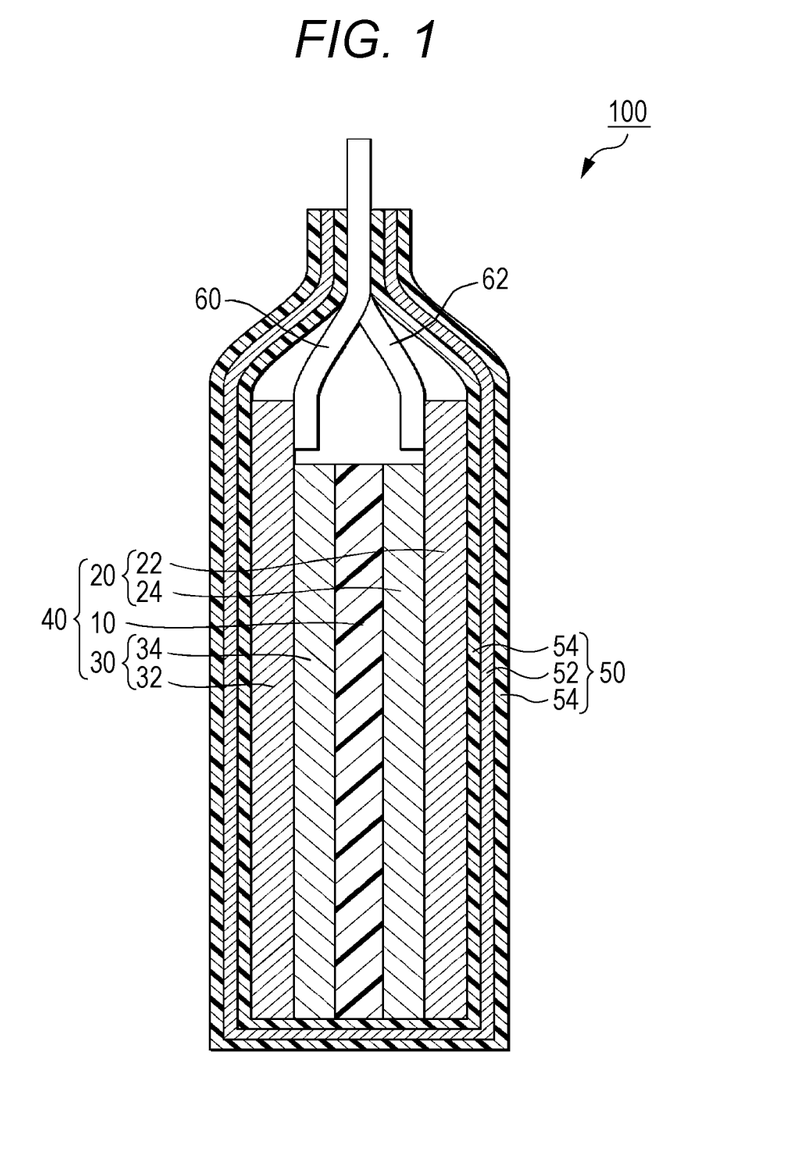
FIG. 1 is a schematic cross-sectional view of a lithium ion secondary battery according to an embodiment.

The electrodes and the lithium ion secondary battery according to the present embodiment will be briefly described with reference to FIG. 1. The lithium ion secondary battery 100 is mainly provided with a stacked body 40, a case 50 housing the stacked body 40 in a sealed state, and a pair of leads 60, 62 connected to the stacked body 40. While not shown in the drawings, an electrolyte is also housed in the case 50 along with the stacked body 40.

In the stacked body 40, a positive electrode 20 and a negative electrode 30 are disposed opposite each other across a separator 10 containing a nonaqueous electrolyte. The positive electrode 20 includes a plate-like (film) positive electrode current collector 22, and a positive electrode active material layer 24 disposed on the positive electrode current collector 22. The negative electrode 30 includes a plate-like (film) negative electrode current collector 32 and a negative electrode active material layer 34 disposed on the negative electrode current collector 32. The positive electrode active material layer 24 and the negative electrode active material layer 34 are in contact with corresponding sides of the separator 10. To corresponding edge parts of the positive electrode current collector 22 and the negative electrode current collector 32, leads 62, 60 are connected. Edge parts of the leads 60, 62 are disposed outside the case 50.

In the following, the positive electrode 20 and the negative electrode 30 may be collectively referred to as the electrode 20, 30. The positive electrode current collector 22 and the negative electrode current collector 32 may be collectively referred to as the current collector 22, 32. The positive electrode active material layer 24 and the negative electrode active material layer 34 may be collectively referred to as the active material layer 24, 34.

The positive electrode active material layer 24 according to the present embodiment includes a positive electrode active material, a positive electrode binder, and a conductive material.

(Positive Electrode Active Material)

A positive electrode active material according to the embodiment includes: a lithium complex oxide expressed by chemical formula (1); a highly thermal conductive compound; and graphene or multilayer graphene.

$$Li_xM1_yM2_{1-y}O_2 \qquad (1)$$

In the formula (1), M1 is at least one metal selected from Ni, Co, and Mn, M2 is at least one metal selected from the group consisting of Al, Fe, Ti, Cr, Mg, Cu, Ga, Zn, Sn, B, V, Ca, and Sr, and x and y are numbers such that $0.05 \leq x \leq 1.2$ and $0.3 \leq y \leq 1$.

A positive electrode active material with the configuration includes the highly thermal conductive compound, and graphene or multilayer graphene. Accordingly, the heat generated during charging is allowed to escape efficiently. As a result, the accumulation of heat in the positive electrode can be suppressed, whereby deterioration of the present positive electrode active material can be suppressed. In this way, cycle characteristics are improved.

The highly thermal conductive compound may have a thermal conductivity higher than at least the lithium complex oxide included in the positive electrode active material. The thermal conductivity of the highly thermal conductive compound may be 10 W/m·K or more. When the thermal conductivity of the highly thermal conductive compound is 10 W/m·K or more, the heat generated during charging can be efficiently dissipated. Accordingly, accumulation of heat in the positive electrode can be suppressed, whereby degradation of the positive electrode active material can be suppressed. As a result, cycle characteristics are increased.

In the lithium complex oxide according to the present embodiment, y may be a number such that $0.5 \leq y \leq 1$, or $0.8 \leq y \leq 1$. In this case, the lithium ion secondary battery according to the present embodiment can exhibit high cycle characteristics and provide high discharge capacity.

Examples of the lithium complex oxide according to the present embodiment include nickel-cobalt-aluminum (NCA) ternary materials such as $Li_{1.0}Ni_{0.83}Co_{0.14}Al_{0.03}O_{2.0}$ and $Li_{1.0}Ni_{0.8}Co_{0.15}Al_{0.05}O_{2.0}$; nickel-cobalt-manganese (NCM) ternary materials such as $Li_{1.0}Ni_{0.8}Co_{0.1}Mn_{0.1}O_{2.0}$, $Li_{1.0}Ni_{0.5}Co_{0.2}Mn_{0.3}O_{2.0}$, $Li_{1.0}Ni_{0.6}Co_{0.2}Mn_{0.2}O_{2.0}$, and $Li_{1.0}Ni_{0.333}Co_{0.333}Mn_{0.333}O_{2.0}$; and lithium cobalt oxide (LCO) such as $LiCoO_2$. Among others, NCA may be preferable as it has high energy density.

The lithium complex oxide according to the present embodiment may be a mixture of two or more of the aforementioned lithium complex oxides.

In the positive electrode active material according to the present embodiment, the highly thermal conductive compound may be at least one selected from the group consisting of AlN, BN, $Si_3N_4$, TiN, ZrN, VN, $Cr_2N$, SiC, WC, TiC, TaC, ZrC, NbC, $Mo_2C$, $Cr_3C_2$, $TiB_2$, $ZrB_2$, $VB_2$, and $NbB_2$. The positive electrode active material particularly includes highly thermal conductive compounds. In this way, the heat generated during charging is allowed to escape efficiently. As a result, the accumulation of heat in the positive electrode can be further suppressed, whereby deterioration of the positive electrode active material can be suppressed. Accordingly, cycle characteristics are improved.

In this positive electrode active material, the highly thermal conductive compound may be at least one selected from the group consisting of AlN, BN, $Si_3N_4$, TiN, ZrN, VN, NbN, and $Cr_2N$. Nitride is very stable. Accordingly, a lithium complex oxide and nitride do not readily react with each other. Thus, cycle characteristics are improved.

The highly thermal conductive compound (weight) used for this positive electrode active material may have a content of 0.05 to 10 wt % with respect to the lithium complex oxide. When the weight of the highly thermal conductive compound relative to the lithium complex oxide is more than 0.05 wt %, the heat generated during charging can escape more efficiently. As a result, cycle characteristics are improved. When the weight of the highly thermal conductive compound relative to the lithium complex oxide is not more than 10 wt %, a decrease in energy density can be suppressed.

The weight of the highly thermal conductive compound relative to the lithium complex oxide may be 0.1 to 5 wt %. When the weight of the highly thermal conductive compound relative to lithium complex oxide is 0.1 to 5 wt %, the above-described effect can be enhanced.

First Embodiment

As described above, the positive electrode active material according to the present embodiment includes a specific lithium complex oxide, a highly thermal conductive compound, and graphene and/or multilayer graphene. The positive electrode active material may be embodied in any form as long as the lithium complex oxide and the highly thermal conductive compound are mixed in the positive electrode active material layer 24. With regard to the state of mixture, the highly thermal conductive compound may be uniformly dispersed in the positive electrode active material layer 24. Alternatively, the lithium complex oxide and the highly thermal conductive compound may be mutually coagulated to form secondary particles.

Second Embodiment

Figure 2:
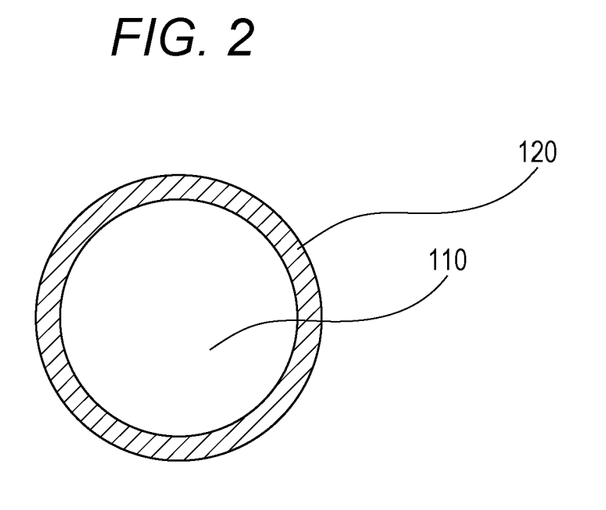
FIG. 2 is a schematic cross-sectional view of a positive electrode active material according to a second embodiment.

The positive electrode active material according to the second embodiment will be described with reference to FIG. 2. For increasing cycle characteristics, the lithium complex oxide 110 may be coated with a coating layer 120. The coating layer 120 may include any one or more of highly thermal conductive compound, graphene, and multilayer graphene. Of course, the lithium complex oxide 110 may not be completely coated with the coating layer 120. When at least a part of the lithium complex oxide 110 is coated with the coating layer including highly thermal conductive compound, graphene, or multilayer graphene, the heat from the heat-generating source can be efficiently conducted and dissipated. Specifically, for example, the ratio of coating of the lithium complex oxide 110 with the highly thermal conductive compound, graphene, or multilayer graphene may be 50% or more. The coating ratio is determined from the cross section of the positive electrode active material, as illustrated in FIG. 2. For example, the extent to which the surface of the lithium complex oxide is coated with the highly thermal conductive compound may be calculated in percentage, and an average value of the calculation results with respect to 50 positive electrode active materials may be taken. Specifically, the coating layer 120 including the highly thermal conductive compound may coat at least a part of the lithium complex oxide 110. In this case, the heat from the heat-generating source can be more efficiently conducted and dissipated. As a result, accumulation of heat in the positive electrode is suppressed, and degradation of the positive electrode active material can be suppressed. Accordingly, cycle characteristics are increased.

Third Embodiment

Figure 3:
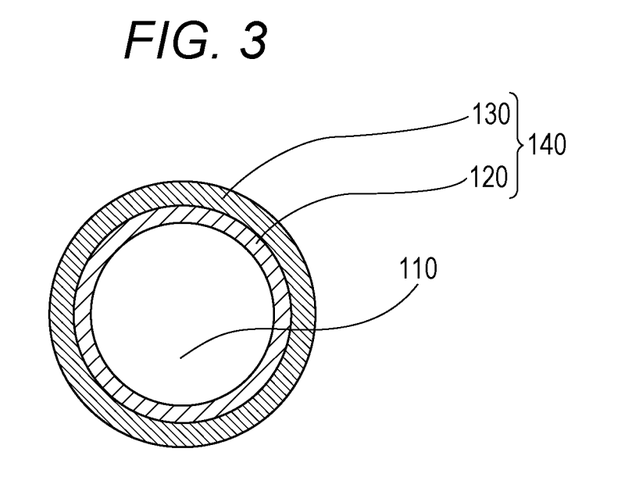
FIG. 3 is a schematic cross-sectional view of a positive electrode active material according to a third embodiment.

The positive electrode active material according to the third embodiment will be described with reference to FIG. 3. The positive electrode active material according to the present embodiment includes the lithium complex oxide 110 and a coating layer 140. The coating layer 140 includes the coating layer 120 and a coating layer 130 which coats at least a part of the coating layer 120. The coating layer 120 may include a highly thermal conductive compound. The coating layer 130 disposed on the coating layer 120 may include graphene or multilayer graphene. In this configuration, the coating layer 120 can be closely attached to the lithium complex oxide 110 more strongly. In addition, the influence of anisotropy of thermal conductivity of the graphene or multilayer graphene included in the coating layer 130 can be absorbed. Accordingly, the heat emitted from the lithium complex oxide can be more rapidly conducted and dissipated. As a result, accumulation of heat in the positive electrode is suppressed, and degradation of the positive electrode active material can be suppressed. As a result, cycle characteristics are increased.

In this positive electrode active material, the highly thermal conductive compound may have an average film thickness of 30 to 300 nm, and the graphene or multilayer graphene may have a film thickness of 50 to 500 nm. When the average film thickness of the highly thermal conductive compound is 30 nm or more, formation of a heat-conducting network path is facilitated. Accordingly, heat can be efficiently dissipated, whereby cycle characteristics are increased. When the average film thickness of the highly thermal conductive compound is not more than 300 nm, a decrease in ion conductivity can be suppressed. Accordingly, a decrease in rate performance can be suppressed. When the film thickness of the graphene or multilayer graphene is 50 nm or more, formation of a heat-conducting network path is facilitated. Accordingly, heat can be efficiently dissipated, whereby cycle characteristics are improved. When the film thickness of the graphene or multilayer graphene is not more than 500 nm, a decrease in ion conductivity can be suppressed. Accordingly, a decrease in rate performance can be suppressed.

Preferably, a film thickness ratio A/B may be such that $0.1 \leq A/B \leq 1.2$, where A is the average film thickness of the highly thermal conductive compound, and B is the film thickness of the graphene or multilayer graphene.

In the first to third embodiments described above, the highly thermal conductive compound contained in the positive electrode active material may have an average primary particle diameter of from 10 to 500 nm. When the average primary particle diameter of the highly thermal conductive compound is 10 nm or more, formation of a heat-conducting network path is facilitated, whereby heat can be efficiently dissipated. In addition, when the average primary particle diameter of the highly thermal conductive compound is not more than 500 nm, the points of contact of particles can be increased, whereby heat can be efficiently dissipated. As a result, cycle characteristics are increased. The average primary particle diameter may be determined from the cross section of the positive electrode active material layer. For example, the primary particle diameter of 50 particles of the highly thermal conductive compound is sampled using a scanning electron microscope (SEM), and an average value of the samples is calculated.

The type of the lithium complex oxide and highly thermal conductive compound included in the positive electrode active material according to the present embodiment can be identified by X-ray diffraction, X-ray photoelectron spectrometry, or energy dispersive X-ray spectrometry analysis. The mixing ratios of the components may be identified by inductively coupled plasma optical emission spectrometry, for example. Among others, X-ray diffraction may preferably be used.

According to the present embodiment, the state of coating and the like of the particle surface of the lithium complex oxide by the highly thermal conductive compound may be observed or measured as follows. For example, the positive electrode is cut and the section is polished by a cross section polisher or an ion milling device. The polished section is observed or measured by using a scanning electron microscope, a transmission electron microscope, or the like.

(Positive Electrode Current Collector)

The positive electrode current collector 22 may be a plate of conductive material. For example, as the positive electrode current collector 22, a metal thin plate with an aluminum, copper, or nickel foil may be used.

(Positive Electrode Binder)

The binder binds the active materials and also binds the active materials with the current collector 22. The binder may be any binder capable of achieving the above binding. Examples of the binder include fluorine resin such as polyvinylidene fluoride (PVDF), polytetrafluoroethylene (PTFE), tetrafluoroethylene/hexafluoropropylene copolymer (FEP), tetrafluoroethylene/perfluoro alkyl vinyl ether copolymer (PFA), ethylene/tetrafluoroethylene copolymer (ETFE), polychlorotrifluoroethylene (PCTFE), ethylene/chlorotrifluoroethylene copolymer (ECTFE), and polyvinyl fluoride (PVF).

Other than the above examples, vinylidene fluoride fluorine rubber may be used as the binder. Examples of fluorine rubber based on vinylidene fluoride include fluorine rubber based on vinylidene fluoride/hexafluoropropylene (VDF/HFP-based fluorine rubber), fluorine rubber based on vinylidene fluoride/hexafluoropropylene/tetrafluoroethylene (VDF/HFPTFE-based fluorine rubber), fluorine rubber based on vinylidene fluoride/pentafluoropropylene (VDF/PFP-based fluorine rubber), fluorine rubber based on vinylidene fluoride/pentafluoropropylene/tetrafluoroethylene (VDF/PFP/TFE-based fluorine rubber), fluorine rubber based on vinylidene fluoride/perfluoromethyl vinyl ether/tetrafluoroethylene (VDF/PFMVE/TFE-based fluorine rubber), and fluorine rubber based on vinylidene fluoride/chlorotrifluoroethylene (VDF/CTFE-based fluorine rubber).

As the binder, a conductive polymer having electronic conductivity or conductive polymer having ion conductivity may be used. An example of the conductive polymer having electronic conductivity is polyacetylene. In this case, the binder will also serve as conductive material, so that other conductive material may not be added. An example of the conductive polymer having ion conductivity is a composite of polymer compound, such as polyethylene oxide or polypropylene oxide, and a lithium salt or an alkali metal salt based on lithium.

(Conductive Material)

Examples of the conductive material include carbon powder of carbon black and the like; carbon nanotube; carbon material; metal fine powder of copper, nickel, stainless steel, or iron; a mixture of carbon material and metal fine powder; and a conductive oxide, such as ITO.

(Negative Electrode Active Material Layer)

The negative electrode active material layer according to the present embodiment includes a negative electrode active material, a negative electrode binder, and a conductive material.

(Negative Electrode Active Material)

The negative electrode active material may be a compound capable of lithium ion intercalation and deintercalation. As the negative electrode active material, known negative electrode active material for lithium-ion batteries may be used. As the negative electrode active material, substance capable of lithium ion intercalation and deintercalation may be used. Examples of such substance include carbon material such as graphite (natural graphite and synthetic graphite), carbon nanotube, hard carbon, soft carbon, and low temperature heat-treated carbon; metals that can be combined with lithium, such as aluminum, silicon, and tin; amorphous compound based on an oxide such as silicon dioxide and tin dioxide; and particles including lithium titanate ($Li_4Ti_5O_{12}$) or the like. The negative electrode active material may be graphite, which has high capacity per unit weight and is relatively stable.

(Negative Electrode Current Collector)

The negative electrode current collector 32 may be a plate of conductive material. As the negative electrode current collector 32, a metal thin plate including aluminum, copper, or nickel foil may be used.

(Negative Electrode Conductive Material)

Examples of the conductive material include carbon material such as carbon powder of carbon black and the like, and carbon nanotube; metal fine powder of copper, nickel, stainless, or iron; a mixture of carbon material and metal fine powder; and conductive oxide such as ITO.

(Negative Electrode Binder)

As the binder used in the negative electrode, materials similar to those for the positive electrode may be used.

(Negative Electrode Conductive Material)

The same conductive material that is used for the positive electrode may be used for the negative electrode.

(Separator)

The material of the separator 10 may have an electrically insulating porous structure. Examples of the material include a single-layer body or stacked body of polyethylene, polypropylene, or polyolefin film; extended film of a mixture of the aforementioned resins; and fibrous nonwoven fabric including at least one constituent material selected from the group consisting of cellulose, polyester, and polypropylene.

(Non-Aqueous Electrolyte)

The non-aqueous electrolyte includes electrolyte dissolved in non-aqueous solvent. The non-aqueous solvent may contain cyclic carbonate and chain carbonate.

The cyclic carbonate is not particularly limited as long as it is capable of solvating the electrolyte, and known cyclic carbonate may be used. Examples of the cyclic carbonate include ethylene carbonate, propylene carbonate, and butylene carbonate.

The chain carbonate is not particularly limited as long as it is capable of decreasing the viscosity of the cyclic carbonate, and known chain carbonate may be used. Examples of the chain carbonate include diethyl carbonate, dimethyl carbonate, and ethyl methyl carbonate. As the chain carbonate, there may be used a mixture of methyl acetate, ethyl acetate, methyl propionate, ethyl propionate, γ-butyrolactone, 1,2-dimethoxyethane, 1,2-diethoxyethane, and the like.

The ratio of the cyclic carbonate and the chain carbonate in the non-aqueous solvent may be 1:9 to 1:1 by volume.

Examples of the electrolyte include lithium salts such as $LiPF_6$, $LiClO_4$, $LiBF_4$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. Any of the lithium salts may be used individually, or two or more lithium salts may be used in combination. Particularly, from the viewpoint of electrical conductivity, the electrolyte may preferably include $LiPF_6$.

When $LiPF_6$ is dissolved in non-aqueous solvent, the concentration of the electrolyte in the non-aqueous electrolyte may be adjusted to 0.5 to 2.0 mol/L. When the electrolyte concentration is 0.5 mol/L or more, sufficient conductivity of the non-aqueous electrolyte can be ensured. As a result, sufficient capacity can be more readily obtained during charging/discharging. Further, by limiting the electrolyte concentration to 2.0 mol/L or less, an increase in the viscosity of the non-aqueous electrolyte can be suppressed, and sufficient lithium ion mobility can be ensured. As a result, sufficient capacity can be more readily obtained during charging/discharging.

When $LiPF_6$ is mixed with other electrolytes, the lithium ion concentration in the non-aqueous electrolyte may be adjusted to 0.5 to 2.0 mol/L. Of the lithium ions in the non-aqueous electrolyte, the lithium ions from $LiPF_6$ may have a concentration of 50 mol % or more.

(Method for Manufacturing Positive Electrode Active Material)

The positive electrode active material according to the present embodiment may be manufactured through the following mixing step and coating step.

(Mixing Step)

In the mixing step, the lithium complex oxide, the highly thermal conductive compound and graphene or multilayer graphene are mixed to obtain the positive electrode active material. The mixing method is not particularly limited. For example, mixing is performed using an existing device, such as a Turbula mixer or a Henschel mixer.

(Coating Step)

In the coating step, the high thermal conductive compound and graphene or multilayer graphene are coated on a surface of the lithium complex oxide 110, whereby the coating layer 120 is formed. The method for forming the coating layer 120 is not particularly limited, and a conventional method may be used to form the coating layer 120 on the particle surface. Examples of the method include mechanochemical methods using mechanical energy, such as friction and compression, and a spray dry method of spraying coating liquid onto the particles. Among others, the mechanochemical method may be preferable as it enables formation of uniform coating layers 120 with good adhesion.

(Method for Manufacturing Electrodes 20, 30)

A method for manufacturing the electrode 20 and 30 according to the present embodiment will be described.

The active material, binder, and solvent are mixed to prepare a paint. If necessary, conductive material may be further added. As the solvent, water or N-methyl-2-pyrrolidone may be used. The method of mixing the components of the paint is not particularly limited. The order of mixing is also not particularly limited. The paint is coated onto the current collectors 22 and 32. The coating method is not particularly limited, and a method typically adopted for electrode fabrication may be used. The coating method may include slit die coating and doctor blade method.

Thereafter, the solvent in the paint coating the current collectors 22 and 32 is removed. The removing method is not particularly limited, and may include drying the current collectors 22 and 32 with the paint coat thereon in an atmosphere of 80° C. to 150° C.

The resulting electrodes with the positive electrode active material layer 24 and the negative electrode active material layer 34 respectively formed thereon are pressed by a roll press device or the like as needed. The roll press may have a linear load of 100 to 2500 kgf/cm, for example.

Through the above-described steps, there are obtained the positive electrode 20 including the positive electrode current collector 22 with the positive electrode active material layer 24 formed thereon, and the negative electrode 30 including the negative electrode current collector 32 with the negative electrode active material layer 34 formed thereon.

(Method for Manufacturing Lithium Ion Secondary Battery)

In the following, a method for manufacturing the lithium ion secondary battery 100 according to the present embodiment will be described. The method for manufacturing the lithium ion secondary battery 100 according to the present embodiment includes a step of sealing, in the case (exterior body) 50, the positive electrode 20 and the negative electrode 30 including the above-described active materials, the separator 10 to be disposed between the positive electrode 20 and the negative electrode 30, and the nonaqueous electrolytic solution including lithium salt.

For example, the positive electrode 20 and the negative electrode 30 including the above-described active materials, and the separator 10 are stacked. The positive electrode 20 and the negative electrode 30 are heated and pressed from a direction perpendicular to the stacked direction, using a pressing tool. In this way, the stacked body 40 including the positive electrode 20, the separator 10, and the negative electrode 30 that are mutually closely attached is obtained. The stacked body 40 is then put into a pre-fabricated bag of the case 50, for example, and additionally the nonaqueous electrolytic solution including the above-described lithium salt is injected. In this way, the lithium ion secondary battery 100 is fabricated. Instead of injecting the nonaqueous electrolytic solution including the lithium salt into the case 50, the stacked body 40 may be impregnated in advance in a nonaqueous electrolytic solution including the lithium salt.

It should be noted, however, that the present disclosure is not limited to the embodiment, and that the embodiment is merely illustrative. Any and all configurations that are substantially identical, either in operation or effect, to the technical concept set forth in the claims are included in the technical scope of the present disclosure.

EXAMPLES

Example 1

(Fabrication of Positive Electrode)

Lithium complex oxide of $Li_{1.0}Ni_{0.83}Co_{0.14}Al_{0.03}O_{2.0}$ (hereafter referred to as NCA) and AlN (from IoLiTec GmbH) with an average particle diameter of 50 nm were weighed at a mass ratio of 100:0.1. The surface of NCA was coated with AlN by a mechanochemical method. The NCA coating the AlN and graphene having an average thickness of 8 nm were weighed to achieve a mass ratio of 100.1:2. By mechanochemical method, the NCA coating the AlN was coated with graphene, obtaining a positive electrode active material. A mixture of the resultant active material, polyvinylidene fluoride (PVDF) as a binder, and acetylene black was dispersed in a solvent of N-methyl-2-pyrrolidone (NMP), preparing a slurry. The slurry was prepared in such a way that the positive electrode active material, acetylene black, and PVDF in the slurry had a ratio by weight of 93:3:4. The slurry was coated on an aluminum foil having a thickness of 20 μm for the current collector, dried, and then pressed at a linear load of 1000 kgf/cm. In this way, the positive electrode of Example 1 was obtained.

(Measurement of Highly Thermal Conductive Compound in Positive Electrode)

The state of coating of the lithium complex oxide particle surface by AlN and graphene was observed (measured) by using a transmission electron microscope (TEM), a scanning electron microscope (SEM), energy dispersive X-ray (EDX) spectrometry analysis, a cross section polisher, and an ion milling device. Samples to be subjected to measurement were fabricated by cutting the positive electrode and polishing the cross section using the cross section polisher and the ion milling device.

By the observation of the positive electrode surface and the positive electrode cross section by the SEM, EDX, and the TEM, formation of a uniform AlN coating on the lithium complex oxide particle surface, and coating of uniform graphene on the surface of the AlN coating layer were confirmed.

(Fabrication of Negative Electrode)

A slurry was prepared by dispersing 90 parts by mass of natural graphite powder as the negative electrode active material and 10 parts by mass of PVDF in NMP. The slurry was applied to a copper foil with a thickness of 15 The copper foil with the slurry applied thereon was dried under reduced pressure at a temperature of 140° C. for 30 minutes, and then pressed using a roll press device. In this way, the negative electrode was obtained.

(Nonaqueous Electrolyte)

In a mixture solvent of ethylene carbonate (EC) and diethyl carbonate (DEC), $LiPF_6$ was dissolved to 1.0 mol/L, whereby a nonaqueous electrolyte was obtained. In the mixture solvent, the volume ratio of EC and DEC was EC:DEC=30:70.

(Separator)

A polyethylene porous film (pore ratio: 40%, shutdown temperature: 134° C.) with a film thickness of 16 μm was prepared.

(Battery Fabrication)

A generator element was constructed by stacking the positive electrode, the negative electrode, and the separator. The generator element and the non-aqueous electrolyte were used to fabricate a battery cell according to Example 1.

(C rate)

The current density such that the battery cell capacity is constant-current discharged in an hour in an environment of 25° C. is referred to as 1 C. In the following, the current density at the time of charging or discharging will be expressed using constant multiples of the C rate (for example, the current density of one tenth of 1 C will be expressed as 0.1 C).

(Measurement of Discharge Capacity)

Using the battery cell of Example 1, constant-current charging was performed at the current density of 0.1 C until voltage reached 4.2 V (vs. Li/Li$^+$). Further, constant-voltage charging was performed at 4.2 V (vs. Li/Li$^+$) until the current density decreased to 0.05 C, when the charge capacity was measured. The results are shown in Table 1 in terms of 0.1 C discharge capacity.

After a pause of 5 minutes, constant-current discharging was performed at the current density of 0.1 C until voltage reached 2.5 V (vs. Li/Li$^+$), when the discharge capacity was measured. The current density was calculated assuming that 1 C corresponded to 186 mAh/g with respect to the amount of the positive electrode active material. Greater discharge capacity is more preferable.

(Cycle Characteristics Measurement)

The battery cell after the rate measurement was subjected to 500 cycles of the charging/discharging procedure at 0.5 C charge/1 C discharge. The charging and discharging were performed in a constant temperature bath at 45° C. With respect to the initial discharge capacity of 100%, the value of discharge capacity after 500 cycles was taken as the capacity retention. Greater capacity retention is more preferable. The calculated results are shown in Table 1 as the average values of capacity retention after 500 cycles.

Example 2

The battery of Example 2 was fabricated and evaluated in the same way as in Example 1 with the exception that, during the fabrication of the positive electrode, the mass ratio of lithium complex oxide and AlN was 100:0.03.

Example 3

The battery of Example 3 was fabricated and evaluated in the same way as in Example 1 with the exception that, during the fabrication of the positive electrode, the mass ratio of lithium complex oxide and AlN was 100:0.05.

Example 4

The battery of Example 4 was fabricated and evaluated in the same way as in Example 1 with the exception that, during the fabrication of the positive electrode, the mass ratio of lithium complex oxide and AlN was 100:1.

Example 5

The battery of Example 5 was fabricated and evaluated in the same way as in Example 1 with the exception that, during the fabrication of the positive electrode, the mass ratio of lithium complex oxide and AlN was 100:5.

Example 6

The battery of Example 6 was fabricated and evaluated in the same way as in Example 1 with the exception that, during the fabrication of the positive electrode, the mass ratio of lithium complex oxide and AlN was 100:10.

Example 7

The battery of Example 7 was fabricated and evaluated in the same way as in Example 1 with the exception that, during the fabrication of the positive electrode, the mass ratio of lithium complex oxide and AlN was 100:11.

Example 8

The battery of Example 8 was fabricated and evaluated in the same way as in Example 1 with the exception that, during the fabrication of the positive electrode, BN was used instead of AlN.

Example 9

The battery of Example 9 was fabricated and evaluated in the same way as in Example 1 with the exception that, during the fabrication of the positive electrode, BN was used instead of AlN, and that the weight ratio of lithium complex oxide and BN was 100:5.

Example 10

The battery of Example 10 was fabricated and evaluated in the same way as in Example 1 with the exception that, during the fabrication of the positive electrode, $Si_3N_4$ was used instead of AlN.

Example 11

The battery of Example 11 was fabricated and evaluated in the same way as in Example 1 with the exception that, during the fabrication of the positive electrode, $Si_3N_4$ was used instead of AlN, and that the weight ratio of lithium complex oxide and $Si_3N_4$ was 100:5.

Example 12

The battery of Example 12 was fabricated and evaluated in the same way as in Example 1 with the exception that, during the fabrication of the positive electrode, TiN was used instead of AlN.

Example 13

The battery of Example 13 was fabricated and evaluated in the same way as in Example 1 with the exception that, during the fabrication of the positive electrode, ZrN was used instead of AlN.

Example 14

The battery of Example 14 was fabricated and evaluated in the same way as in Example 1 with the exception that, during the fabrication of the positive electrode, VN was used instead of AlN.

Example 15

The battery of Example 15 was fabricated and evaluated in the same way as in Example 1 with the exception that, during the fabrication of the positive electrode, $Cr_2N$ was used instead of AlN.

Example 16

The battery of Example 16 was fabricated and evaluated in the same way as in Example 1 with the exception that, during the fabrication of the positive electrode, SiC was used instead of AlN.

Example 17

The battery of Example 17 was fabricated and evaluated in the same way as in Example 1 with the exception that, during the fabrication of the positive electrode, WC was used instead of AlN.

Example 18

The battery of Example 18 was fabricated and evaluated in the same way as in Example 1 with the exception that, during the fabrication of the positive electrode, TiC was used instead of AlN.

Example 19

The battery of Example 19 was fabricated and evaluated in the same way as in Example 1 with the exception that, during the fabrication of the positive electrode, TaC was used instead of AlN.

Example 20

The battery of Example 20 was fabricated and evaluated in the same way as in Example 1 with the exception that, during the fabrication of the positive electrode, ZrC was used instead of AlN.

Example 21

The battery of Example 21 was fabricated and evaluated in the same way as in Example 1 with the exception that, during the fabrication of the positive electrode, NbC was used instead of AlN.

Example 22

The battery of Example 22 was fabricated and evaluated in the same way as in Example 1 with the exception that, during the fabrication of the positive electrode, $Cr_3C_2$ was used instead of AlN.

Example 23

The battery of Example 23 was fabricated and evaluated in the same way as in Example 1 with the exception that, during the fabrication of the positive electrode, $Mo_2C$ was used instead of AlN.

Example 24

The battery of Example 24 was fabricated and evaluated in the same way as in Example 1 with the exception that, during the fabrication of the positive electrode, $TiB_2$ was used instead of AlN.

Example 25

The battery of Example 25 was fabricated and evaluated in the same way as in Example 1 with the exception that, during the fabrication of the positive electrode, $ZrB_2$ was used instead of AlN.

Example 26

The battery of Example 26 was fabricated and evaluated in the same way as in Example 1 with the exception that, during the fabrication of the positive electrode, $VB_2$ was used instead of AlN.

Example 27

The battery of Example 27 was fabricated and evaluated in the same way as in Example 1 with the exception that, during the fabrication of the positive electrode, $NbB_2$ was used instead of AlN.

Example 28

A battery according to Example 28 was fabricated and evaluated by the same method as for Example 1 with the exception that, during the fabrication of the positive electrode, the mass ratio of lithium complex oxide and graphene was 100:0.27.

Example 29

A battery according to Example 29 was fabricated and evaluated by the same method as for Example 1 with the exception that, during the fabrication of the positive electrode, the mass ratio of lithium complex oxide and graphene was 100:0.33.

Example 30

A battery according to Example 30 was fabricated and evaluated by the same method as for Example 1 with the exception that, during the fabrication of the positive electrode, the mass ratio of lithium complex oxide and graphene was 100:3.33.

Example 31

A battery according to Example 31 was fabricated and evaluated by the same method as for Example 1 with the exception that, during the fabrication of the positive electrode, the mass ratio of lithium complex oxide and graphene was 100:3.67.

Example 32

A battery according to Example 32 was fabricated and evaluated by the same method as for Example 1 with the exception that, during the fabrication of the positive electrode, a step of coating graphene was performed without performing the step of coating of the lithium complex oxide with AlN, and, thereafter, the lithium complex oxide and AlN were mixed using a Turbula mixer.

Example 33

A battery according to Example 33 was fabricated and evaluated by the same method as for Example 1 with the exception that, during the fabrication of the positive electrode, the lithium complex oxide and graphene were mixed by using a Turbula mixer without performing the step of coating the lithium complex oxide with graphene.

Example 34

A battery according to Example 34 was fabricated and evaluated by the same method as for Example 1 with the exception that, during the fabrication of the positive electrode, the lithium complex oxide, AlN, and graphene were mixed by using a Turbula mixer without performing the step of coating the lithium complex oxide with AlN and graphene.

Example 35

The battery of Example 35 was fabricated and evaluated in the same way as in Example 1 with the exception that, during the fabrication of the positive electrode, BN was used instead of AlN, and that the lithium complex oxide, BN and graphene were mixed using the Turbula mixer without performing the step of coating the lithium complex oxide.

Example 36

The battery of Example 36 was fabricated and evaluated in the same way as in Example 1 with the exception that, during the fabrication of the positive electrode, $Si_3N_4$ was used instead of AlN, and that lithium complex oxide, $Si_3N_4$ and graphene were mixed using the Turbula mixer without performing the step of coating the lithium complex oxide.

Example 37

The battery of Example 37 was fabricated and evaluated in the same way as in Example 1 with the exception that, during the fabrication of the positive electrode, AlN with an average primary particle diameter of 10 nm was used instead of AlN with the average primary particle diameter of 50 nm.

Example 38

The battery of Example 38 was fabricated and evaluated in the same way as in Example 1 with the exception that, during the fabrication of the positive electrode, AlN with an average primary particle diameter of 100 nm was used instead of AlN with the average primary particle diameter 50 nm.

Example 39

The battery of Example 39 was fabricated and evaluated in the same way as in Example 1 with the exception that, during the fabrication of the positive electrode, AlN with an average primary particle diameter 500 nm was used instead of AlN with an average primary particle diameter 50 nm.

Example 40

The battery of Example 40 was fabricated and evaluated in the same way as in Example 1 with the exception that, during the fabrication of the positive electrode, lithium complex oxide of $Li_{1.0}Ni_{0.8}Co_{0.1}Al_{0.1}O_{2.0}$ was used instead of the lithium complex oxide of $Li_{1.0}Ni_{0.83}Co_{0.14}Al_{0.03}O_{2.0}$.

Example 41

The battery of Example 41 was fabricated and evaluated in the same way as in Example 1 with the exception that, during the fabrication of the positive electrode, lithium complex oxide of $Li_{1.0}Ni_{0.8}Co_{0.1}Mn_{0.1}O_{2.0}$ was used instead of the lithium complex oxide of $Li_{1.0}Ni_{0.83}Co_{0.14}Al_{0.03}O_{2.0}$, and that, during the discharge capacity measurement, the current density of 1 C was computed as 160 mAh/g with respect to the amount of the positive electrode active material.

Example 42

The battery of Example 42 was fabricated and evaluated in the same way as in Example 1 with the exception that, during the fabrication of the positive electrode, lithium complex oxide of $Li_{1.0}Ni_{0.5}Co_{0.2}Mn_{0.3}O_{2.0}$ was used instead of the lithium complex oxide of $Li_{1.0}Ni_{0.83}Co_{0.14}Al_{0.03}O_{2.0}$, and that, during the discharge capacity measurement, the current density of 1 C was computed as 160 mAh/g with respect to the amount of the positive electrode active material.

Example 43

The battery of Example 43 was fabricated and evaluated in the same way as in Example 1 with the exception that, during the fabrication of the positive electrode, lithium complex oxide of $Li_{1.0}Ni_{0.34}Co_{0.33}Mn_{0.33}O_{2.0}$ was used instead of the lithium complex oxide of $Li_{1.0}Ni_{0.83}Co_{0.14}Al_{0.03}O_{2.0}$, and that, during the discharge capacity measurement, the current density of 1 C was computed as 160 mAh/g with respect to the amount of the positive electrode active material.

Example 44

The battery of Example 44 was fabricated and evaluated in the same way as in Example 1 with the exception that, during the fabrication of the positive electrode, lithium complex oxide of $Li_{1.0}Ni_{0.6}Co_{0.2}Mn_{0.2}O_{2.0}$ was used instead of the lithium complex oxide of $Li_{1.0}Ni_{0.83}Co_{0.14}Al_{0.03}O_{2.0}$, and that, during the discharge capacity measurement, the current density of 1 C was computed as 160 mAh/g with respect to the amount of the positive electrode active material.

Example 45

The battery of Example 45 was fabricated and evaluated in the same way as in Example 1 with the exception that, during the fabrication of the positive electrode, lithium complex oxide of $LiCoO_2$ was used instead of the lithium complex oxide of $Li_{0.1}Ni_{0.83}Co_{0.14}Al_{0.03}O_{2.0}$, and that, during the discharge capacity measurement, the current density of 1 C was computed as 160 mAh/g with respect to the amount of the positive electrode active material.

Example 46

A battery according to Example 46 was fabricated and evaluated by the same method as for Example 1 with the exception that, during the fabrication of the positive electrode, BN was used instead of AlN, and the weight ratio of lithium complex oxide and BN was 100:0.03.

Example 47

A battery according to Example 47 was fabricated and evaluated by the same method as for Example 1 with the exception that, during the fabrication of the positive electrode, BN was used instead of AlN, and the weight ratio of lithium complex oxide and BN was 100:0.05.

Example 48

A battery according to Example 48 was fabricated and evaluated by the same method as for Example 1 with the exception that, during the fabrication of the positive electrode, BN was used instead of AlN, and the weight ratio of lithium complex oxide and BN was 100:10.

Example 49

A battery according to Example 49 was fabricated and evaluated by the same method as for Example 1 with the exception that, during the fabrication of the positive electrode, BN was used instead of AlN, and the weight ratio of lithium complex oxide and BN was 100:11.

Example 50

A battery according to Example 50 was fabricated and evaluated by the same method as for Example 1 with the exception that, during the fabrication of the positive electrode, $Si_3N_4$ was used instead of AlN, and the weight ratio of lithium complex oxide and $Si_3N_4$ was 100:0.03.

Example 51

A battery according to Example 51 was fabricated and evaluated by the same method as for Example 1 with the exception that, during the fabrication of the positive electrode, $Si_3N_4$ was used instead of AlN, and the weight ratio of lithium complex oxide and $Si_3N_4$ was 100:0.05.

Example 52

A battery according to Example 52 was fabricated and evaluated by the same method as for Example 1 with the exception that, during the fabrication of the positive electrode, $Si_3N_4$ was used instead of AlN, and the weight ratio of lithium complex oxide and $Si_3N_4$ was 100:10.

Example 53

A battery according to Example 53 was fabricated and evaluated by the same method as for Example 1 with the exception that, during the fabrication of the positive electrode, $Si_3N_4$ was used instead of AlN, and the weight ratio of lithium complex oxide and $Si_3N_4$ was 100:11.

Example 54

A battery according to Example 54 was fabricated and evaluated by the same method as for Example 1 with the exception that, during the fabrication of the positive electrode, instead of the lithium complex oxide of $Li_{1.0}Ni_{0.83}Co_{0.14}Al_{0.03}O_{2.0}$, the lithium complex oxide of $Li_{1.0}Ni_{0.8}Co_{0.1}Mn_{0.1}O_{2.0}$ was used, and the weight ratio of lithium complex oxide and AlN was 100:0.03.

Example 55

A battery according to Example 55 was fabricated and evaluated by the same method as for Example 1 with the exception that, during the fabrication of the positive electrode, instead of the lithium complex oxide of $Li_{1.0}Ni_{0.83}Co_{0.14}Al_{0.03}O_{2.0}$, the lithium complex oxide of $Li_{1.0}Ni_{0.8}Co_{0.1}Mn_{0.1}O_{2.0}$ was used, and the weight ratio of lithium complex oxide and AlN was 100:0.05.

Example 56

A battery according to Example 56 was fabricated and evaluated by the same method as for Example 1 with the exception that, during the fabrication of the positive electrode, instead of the lithium complex oxide of $Li_{1.0}Ni_{0.83}Co_{0.14}Al_{0.03}O_{2.0}$, the lithium complex oxide of $Li_{1.0}Ni_{0.8}Co_{0.1}Mn_{0.1}O_{2.0}$ was used, and the weight ratio of lithium complex oxide and AlN was 100:1.

Example 57

A battery according to Example 57 was fabricated and evaluated by the same method as for Example 1 with the exception that, during the fabrication of the positive electrode, instead of the lithium complex oxide of $Li_{1.0}Ni_{0.83}Co_{0.14}Al_{0.03}O_{2.0}$, the lithium complex oxide of $Li_{1.0}Ni_{0.8}Co_{0.1}Mn_{0.1}O_{2.0}$ was used, and the weight ratio of lithium complex oxide and AlN was 100:5.

Example 58

A battery according to Example 58 was fabricated and evaluated by the same method as for Example 1 with the exception that, during the fabrication of the positive electrode, instead of the lithium complex oxide of $Li_{1.0}Ni_{0.83}Co_{0.14}Al_{0.03}O_{2.0}$, the lithium complex oxide of $Li_{1.0}Ni_{0.8}Co_{0.1}Mn_{0.1}O_{2.0}$ was used, and the weight ratio of lithium complex oxide and AlN was 100:10.

Example 59

A battery according to Example 59 was fabricated and evaluated by the same method as for Example 1 with the exception that, during the fabrication of the positive electrode, instead of the lithium complex oxide of $Li_{1.0}Ni_{0.83}Co_{0.14}Al_{0.03}O_{2.0}$, the lithium complex oxide of $Li_{1.0}Ni_{0.8}Co_{0.1}Mn_{0.1}O_{2.0}$ was used, and the weight ratio of lithium complex oxide and AlN was 100:11.

Example 60

A battery according to Example 60 was fabricated and evaluated by the same method as for Example 1 with the exception that, during the fabrication of the positive electrode, instead of the lithium complex oxide of $Li_{1.0}Ni_{0.83}Co_{0.14}Al_{0.03}O_{2.0}$, the lithium complex oxide of $Li_{1.0}Ni_{0.8}Co_{0.1}Mn_{0.1}O_{2.0}$ was used, BN was used instead of AlN, and the weight ratio of lithium complex oxide and BN was 100:0.1.

Example 61

A battery according to Example 61 was fabricated and evaluated by the same method as for Example 1 with the exception that, during the fabrication of the positive electrode, instead of the lithium complex oxide of $Li_{1.0}Ni_{0.83}Co_{0.14}Al_{0.03}O_{2.0}$, the lithium complex oxide of $Li_{1.0}Ni_{0.8}Co_{0.1}Mn_{0.1}O_{2.0}$ was used, BN was used instead of AlN, and the weight ratio of lithium complex oxide and BN was 100:5.

Example 62

A battery according to Example 62 was fabricated and evaluated by the same method as for Example 1 with the exception that, during the fabrication of the positive electrode, instead of the lithium complex oxide of $Li_{1.0}Ni_{0.83}Co_{0.14}Al_{0.03}O_{2.0}$, the lithium complex oxide of $Li_{1.0}Ni_{0.8}Co_{0.1}Mn_{0.1}O_{2.0}$ was used, $Si_3N_4$ was used instead of AlN, and the weight ratio of lithium complex oxide and $Si_3N_4$ was 100:0.1.

Example 63

A battery according to Example 63 was fabricated and evaluated by the same method as for Example 1 with the exception that, during the fabrication of the positive electrode, instead of the lithium complex oxide of $Li_{1.0}Ni_{0.83}Co_{0.14}Al_{0.03}O_{2.0}$, the lithium complex oxide of $Li_{1.0}Ni_{0.8}Co_{0.1}Mn_{0.1}O_{2.0}$ was used, $Si_3N_4$ was used instead of AlN, and the weight ratio of lithium complex oxide and $Si_3N_4$ was 100:5.

Comparative Example 1

A battery according to Comparative Example 1 was fabricated and evaluated by the same method as for Example 1 with the exception that, during the fabrication of the positive electrode, AlN and graphene were not used.

Comparative Example 2

A battery according to Comparative Example 2 was fabricated and evaluated by the same method as for Example 1 with the exception that, during the fabrication of the positive electrode, AlN and graphene were not used, and the lithium complex oxide of $Li_{1.0}Ni_{0.8}Co_{0.1}Al_{0.1}O_{2.0}$ was used instead of the lithium complex oxide of $Li_{1.0}Ni_{0.83}Co_{0.14}Al_{0.03}O_{2.0}$.

Comparative Example 3

A battery according to Comparative Example 3 was fabricated and evaluated by the same method as for Example 1 with the exception that, during the fabrication of the positive electrode, AlN and graphene were not used; lithium complex oxide of $Li_{1.0}Ni_{0.8}Co_{0.1}Mn_{0.1}O_{2.0}$ was used instead of the lithium complex oxide of $Li_{1.0}Ni_{0.83}Co_{0.14}Al_{0.03}O_{2.0}$; and, during the measurement of discharge capacity, calculations were performed with 1 C of current density corresponding to 160 mAh/g with respect to the positive electrode active material.

Comparative Example 4

A battery according to Comparative Example 4 was fabricated and evaluated by the same method as for Example 1 with the exception that, during the fabrication of the positive electrode, AlN and graphene were not used; the lithium complex oxide of $Li_{1.0}Ni_{0.5}Co_{0.2}Mn_{0.3}O_{2.0}$ was used instead of the lithium complex oxide of $Li_{1.0}Ni_{0.83}Co_{0.14}Al_{0.03}O_{2.0}$; and, during the measurement of discharge capacity, calculations were performed with 1 C of current density corresponding to 160 mAh/g with respect to the positive electrode active material.

Comparative Example 5

A battery according to Comparative Example 5 was fabricated and evaluated by the same method as for Example 1 with the exception that, during the fabrication of the positive electrode, AlN and graphene were not used; the lithium complex oxide of $Li_{1.0}Ni_{0.34}Co_{0.33}Mn_{0.33}O_{2.0}$ was used instead of the lithium complex oxide of $Li_{1.0}Ni_{0.83}Co_{0.14}Al_{0.03}O_{2.0}$; and, during the measurement of discharge capacity, calculations were performed with 1 C of current density corresponding to 160 mAh/g with respect to the positive electrode active material.

Comparative Example 6

A battery according to Comparative Example 6 was fabricated and evaluated by the same method as for Example 1 with the exception that, during the fabrication of the positive electrode, AlN and graphene were not used; the lithium complex oxide of $Li_{1.0}Ni_{0.6}Co_{0.2}Mn_{0.2}O_{2.0}$ was used instead of the lithium complex oxide of $Li_{1.0}Ni_{0.83}Co_{0.14}Al_{0.03}O_{2.0}$; and, during the measurement of discharge capacity, calculations were performed with 1 C of current density corresponding to 160 mAh/g with respect to the positive electrode active material.

Comparative Example 7

A battery according to Comparative Example 7 was fabricated and evaluated by the same method as for Example 1 with the exception that, during the fabrication of the positive electrode, AlN and graphene were not used, the lithium complex oxide of $LiCoO_2$ was used instead of the lithium complex oxide of $Li_{1.0}Ni_{0.83}Co_{0.14}Al_{0.03}O_{2.0}$; and, during the measurement of discharge capacity, calculations were performed with 1 C of current density corresponding to 160 mAh/g with respect to the positive electrode active material.

Comparative Example 8

A battery according to Comparative Example 8 was fabricated and evaluated by the same method as for Example 1 with the exception that, during the fabrication of the positive electrode, $SiO_2$ was used instead of AlN, and graphene was not used.

Comparative Example 9

A battery according to Comparative Example 9 was fabricated and evaluated by the same method as for Example 1 with the exception that, during the fabrication of the positive electrode, AlN was not used.

Comparative Example 10

A battery according to Comparative Example 10 was fabricated and evaluated by the same method as for Example 1 with the exception that, during the fabrication of the positive electrode, graphene was not used.

TABLE 1

| | Lithium-nickel composite oxide | High thermal conductive compound | Weight ratio of high thermal conductive compound to lithium-nickel composite oxide [wt %] | High thermal conductive compound coating process | Graphene or multilayer graphene coating process | Average film thickness of high thermal conductive compound [nm] | Average film thickness of graphene or multilayer graphene [nm] | Average primary particle diameter of high thermal conductive [nm] | 0.1 C discharge capacity [mAh/g] | Capacity retention after 500 cycles [%] |
|---|---|---|---|---|---|---|---|---|---|---|
| Example 1 | $Li_{1.0}Ni_{0.83}Co_{0.14}Al_{0.03}O_{2.0}$ | AlN | 0.1 | Yes | Yes | 30 | 300 | 50 | 186 | 98 |
| Example 2 | $Li_{1.0}Ni_{0.83}Co_{0.14}Al_{0.03}O_{2.0}$ | AlN | 0.03 | Yes | Yes | 10 | 300 | 50 | 186 | 94 |
| Example 3 | $Li_{1.0}Ni_{0.83}Co_{0.14}Al_{0.03}O_{2.0}$ | AlN | 0.05 | Yes | Yes | 15 | 300 | 50 | 186 | 98 |
| Example 4 | $Li_{1.0}Ni_{0.83}Co_{0.14}Al_{0.03}O_{2.0}$ | AlN | 1 | Yes | Yes | 150 | 300 | 50 | 185 | 98 |
| Example 5 | $Li_{1.0}Ni_{0.83}Co_{0.14}Al_{0.03}O_{2.0}$ | AlN | 5 | Yes | Yes | 300 | 300 | 50 | 184 | 98 |
| Example 6 | $Li_{1.0}Ni_{0.83}Co_{0.14}Al_{0.03}O_{2.0}$ | AlN | 10 | Yes | Yes | 400 | 300 | 50 | 180 | 97 |
| Example 7 | $Li_{1.0}Ni_{0.83}Co_{0.14}Al_{0.03}O_{2.0}$ | AlN | 11 | Yes | Yes | 450 | 300 | 50 | 180 | 95 |
| Example 8 | $Li_{1.0}Ni_{0.83}Co_{0.14}Al_{0.03}O_{2.0}$ | BN | 0.1 | Yes | Yes | 30 | 300 | 50 | 185 | 96 |
| Example 9 | $Li_{1.0}Ni_{0.83}Co_{0.14}Al_{0.03}O_{2.0}$ | BN | 5 | Yes | Yes | 300 | 300 | 50 | 184 | 97 |
| Example 10 | $Li_{1.0}Ni_{0.83}Co_{0.14}Al_{0.03}O_{2.0}$ | $Si_3N_4$ | 0.1 | Yes | Yes | 30 | 300 | 50 | 185 | 94 |
| Example 11 | $Li_{1.0}Ni_{0.83}Co_{0.14}Al_{0.03}O_{2.0}$ | $Si_3N_4$ | 5 | Yes | Yes | 300 | 300 | 50 | 183 | 95 |
| Example 12 | $Li_{1.0}Ni_{0.83}Co_{0.14}Al_{0.03}O_{2.0}$ | TiN | 0.1 | Yes | Yes | 30 | 300 | 200 | 184 | 95 |
| Example 13 | $Li_{1.0}Ni_{0.83}Co_{0.14}Al_{0.03}O_{2.0}$ | ZrN | 0.1 | Yes | Yes | 30 | 300 | 250 | 184 | 96 |
| Example 14 | $Li_{1.0}Ni_{0.83}Co_{0.14}Al_{0.03}O_{2.0}$ | VN | 0.1 | Yes | Yes | 30 | 300 | 200 | 184 | 95 |
| Example 15 | $Li_{1.0}Ni_{0.83}Co_{0.14}Al_{0.03}O_{2.0}$ | $Cr_2N$ | 0.1 | Yes | Yes | 30 | 300 | 400 | 185 | 96 |
| Example 16 | $Li_{1.0}Ni_{0.83}Co_{0.14}Al_{0.03}O_{2.0}$ | SiC | 0.1 | Yes | Yes | 30 | 300 | 300 | 184 | 91 |
| Example 17 | $Li_{1.0}Ni_{0.83}Co_{0.14}Al_{0.03}O_{2.0}$ | WC | 0.1 | Yes | Yes | 30 | 300 | 200 | 182 | 91 |
| Example 18 | $Li_{1.0}Ni_{0.83}Co_{0.14}Al_{0.03}O_{2.0}$ | TiC | 0.1 | Yes | Yes | 30 | 300 | 600 | 183 | 87 |
| Example 19 | $Li_{1.0}Ni_{0.83}Co_{0.14}Al_{0.03}O_{2.0}$ | TaC | 0.1 | Yes | Yes | 30 | 300 | 350 | 183 | 91 |
| Example 20 | $Li_{1.0}Ni_{0.83}Co_{0.14}Al_{0.03}O_{2.0}$ | ZrC | 0.1 | Yes | Yes | 30 | 300 | 300 | 182 | 90 |
| Example 21 | $Li_{1.0}Ni_{0.83}Co_{0.14}Al_{0.03}O_{2.0}$ | NbC | 0.1 | Yes | Yes | 30 | 300 | 150 | 183 | 90 |
| Example 22 | $Li_{1.0}Ni_{0.83}Co_{0.14}Al_{0.03}O_{2.0}$ | $Cr_3C_2$ | 0.1 | Yes | Yes | 30 | 300 | 8 | 184 | 86 |
| Example 23 | $Li_{1.0}Ni_{0.83}Co_{0.14}Al_{0.03}O_{2.0}$ | $Mo_2C$ | 0.1 | Yes | Yes | 30 | 300 | 300 | 183 | 90 |
| Example 24 | $Li_{1.0}Ni_{0.83}Co_{0.14}Al_{0.03}O_{2.0}$ | $TiB_2$ | 0.1 | Yes | Yes | 30 | 300 | 200 | 182 | 91 |
| Example 25 | $Li_{1.0}Ni_{0.83}Co_{0.14}Al_{0.03}O_{2.0}$ | $ZrB_2$ | 0.1 | Yes | Yes | 30 | 300 | 200 | 183 | 91 |
| Example 26 | $Li_{1.0}Ni_{0.83}Co_{0.14}Al_{0.03}O_{2.0}$ | $VB_2$ | 0.1 | Yes | Yes | 30 | 300 | 350 | 184 | 91 |
| Example 27 | $Li_{1.0}Ni_{0.83}Co_{0.14}Al_{0.03}O_{2.0}$ | $NbB_2$ | 0.1 | Yes | Yes | 30 | 300 | 400 | 185 | 90 |
| Example 28 | $Li_{1.0}Ni_{0.83}Co_{0.14}Al_{0.03}O_{2.0}$ | AlN | 0.1 | Yes | Yes | 30 | 300 | 400 | 183 | 93 |
| Example 29 | $Li_{1.0}Ni_{0.83}Co_{0.14}Al_{0.03}O_{2.0}$ | AlN | 0.1 | Yes | Yes | 30 | 40 | 50 | 186 | 96 |
| Example 30 | $Li_{1.0}Ni_{0.83}Co_{0.14}Al_{0.03}O_{2.0}$ | AlN | 0.1 | Yes | Yes | 30 | 50 | 50 | 186 | 96 |
| Example 31 | $Li_{1.0}Ni_{0.83}Co_{0.14}Al_{0.03}O_{2.0}$ | AlN | 0.1 | Yes | Yes | 30 | 500 | 50 | 186 | 93 |
| Example 32 | $Li_{1.0}Ni_{0.83}Co_{0.14}Al_{0.03}O_{2.0}$ | AlN | 0.1 | Yes | Yes | 30 | 550 | 50 | 186 | 94 |
| Example 33 | $Li_{1.0}Ni_{0.83}Co_{0.14}Al_{0.03}O_{2.0}$ | AlN | 0.1 | No | Yes | 30 | 300 | 50 | 186 | 96 |
| Example 34 | $Li_{1.0}Ni_{0.83}Co_{0.14}Al_{0.03}O_{2.0}$ | AlN | 0.1 | Yes | No | 30 | 300 | 50 | 184 | 95 |
| Example 35 | $Li_{1.0}Ni_{0.83}Co_{0.14}Al_{0.03}O_{2.0}$ | BN | 0.1 | No | No | 30 | 300 | 50 | 183 | 93 |
| Example 36 | $Li_{1.0}Ni_{0.83}Co_{0.14}Al_{0.03}O_{2.0}$ | $Si_3N_4$ | 0.1 | No | Yes | 30 | 300 | 50 | 183 | 92 |
| Example 37 | $Li_{1.0}Ni_{0.83}Co_{0.14}Al_{0.03}O_{2.0}$ | AlN | 0.1 | Yes | Yes | 30 | 300 | 10 | 185 | 98 |
| Example 38 | $Li_{1.0}Ni_{0.83}Co_{0.14}Al_{0.03}O_{2.0}$ | AlN | 0.1 | Yes | Yes | 30 | 300 | 100 | 186 | 98 |
| Example 39 | $Li_{1.0}Ni_{0.83}Co_{0.14}Al_{0.03}O_{2.0}$ | AlN | 0.1 | Yes | Yes | 30 | 300 | 500 | 185 | 97 |
| Example 40 | $Li_{1.0}Ni_{0.80}Co_{0.10}Al_{0.10}O_{2.0}$ | AlN | 0.1 | Yes | Yes | 30 | 300 | 50 | 180 | 94 |
| Example 41 | $Li_{1.0}Ni_{0.80}Co_{0.10}Mn_{0.10}O_{2.0}$ | AlN | 0.1 | Yes | Yes | 30 | 300 | 50 | 185 | 95 |
| Example 42 | $Li_{1.0}Ni_{0.50}Co_{0.20}Mn_{0.30}O_{2.0}$ | AlN | 0.1 | Yes | Yes | 30 | 300 | 50 | 165 | 96 |
| Example 43 | $Li_{1.0}Ni_{0.34}Co_{0.33}Mn_{0.33}O_{2.0}$ | AlN | 0.1 | Yes | Yes | 30 | 300 | 50 | 158 | 96 |
| Example 44 | $Li_{1.0}Ni_{0.60}Co_{0.20}Mn_{0.20}O_{2.0}$ | AlN | 0.1 | Yes | Yes | 30 | 300 | 50 | 174 | 96 |

TABLE 1-continued

| | Lithium-nickel composite oxide | High thermal conductive compound | Weight ratio of high thermal conductive compound to lithium-nickel composite oxide [wt %] | High thermal conductive compound coating process | Graphene or multilayer graphene coating process | Average film thickness of high thermal conductive compound [nm] | Average film thickness of graphene or multilayer graphene [nm] | Averate primary particle diameter of high thermal conductive | 0.1 C discharge capacity [mAh/g] | Capacity retention after 500 cycles [%] |
|---|---|---|---|---|---|---|---|---|---|---|
| Example 45 | LiCoO$_2$ | AlN | 0.1 | Yes | Yes | 30 | 300 | 50 | 160 | 96 |
| Example 46 | Li$_{1.0}$Ni$_{0.83}$Co$_{0.14}$Al$_{0.03}$O$_{2.0}$ | BN | 0.03 | Yes | Yes | 30 | 300 | 50 | 186 | 93 |
| Example 47 | Li$_{1.0}$Ni$_{0.83}$Co$_{0.14}$Al$_{0.03}$O$_{2.0}$ | BN | 0.05 | Yes | Yes | 30 | 300 | 50 | 186 | 97 |
| Example 48 | Li$_{1.0}$Ni$_{0.83}$Co$_{0.14}$Al$_{0.03}$O$_{2.0}$ | BN | 10 | Yes | Yes | 30 | 300 | 50 | 183 | 96 |
| Example 49 | Li$_{1.0}$Ni$_{0.83}$Co$_{0.14}$Al$_{0.03}$O$_{2.0}$ | BN | 11 | Yes | Yes | 30 | 300 | 50 | 180 | 94 |
| Example 50 | Li$_{1.0}$Ni$_{0.83}$Co$_{0.14}$Al$_{0.03}$O$_{2.0}$ | Si$_3$N$_4$ | 0.03 | Yes | Yes | 30 | 300 | 50 | 186 | 94 |
| Example 51 | Li$_{1.0}$Ni$_{0.83}$Co$_{0.14}$Al$_{0.03}$O$_{2.0}$ | Si$_3$N$_4$ | 0.05 | Yes | Yes | 30 | 300 | 50 | 186 | 97 |
| Example 52 | Li$_{1.0}$Ni$_{0.83}$Co$_{0.14}$Al$_{0.03}$O$_{2.0}$ | Si$_3$N$_4$ | 10 | Yes | Yes | 30 | 300 | 50 | 183 | 96 |
| Example 53 | Li$_{1.0}$Ni$_{0.83}$Co$_{0.14}$Al$_{0.03}$O$_{2.0}$ | Si$_3$N$_4$ | 11 | Yes | Yes | 30 | 300 | 50 | 180 | 93 |
| Example 54 | Li$_{1.0}$Ni$_{0.80}$Co$_{0.10}$Mn$_{0.10}$O$_{2.0}$ | AlN | 0.03 | Yes | Yes | 30 | 300 | 50 | 184 | 94 |
| Example 55 | Li$_{1.0}$Ni$_{0.80}$Co$_{0.10}$Mn$_{0.10}$O$_{2.0}$ | AlN | 0.05 | Yes | Yes | 10 | 300 | 50 | 184 | 98 |
| Example 56 | Li$_{1.0}$Ni$_{0.80}$Co$_{0.10}$Mn$_{0.10}$O$_{2.0}$ | AlN | 1 | Yes | Yes | 15 | 300 | 50 | 183 | 98 |
| Example 57 | Li$_{1.0}$Ni$_{0.80}$Co$_{0.10}$Mn$_{0.10}$O$_{2.0}$ | AlN | 5 | Yes | Yes | 150 | 300 | 50 | 183 | 98 |
| Example 58 | Li$_{1.0}$Ni$_{0.80}$Co$_{0.10}$Mn$_{0.10}$O$_{2.0}$ | AlN | 10 | Yes | Yes | 300 | 300 | 50 | 182 | 97 |
| Example 59 | Li$_{1.0}$Ni$_{0.80}$Co$_{0.10}$Mn$_{0.10}$O$_{2.0}$ | AlN | 11 | Yes | Yes | 400 | 300 | 50 | 178 | 95 |
| Example 60 | Li$_{1.0}$Ni$_{0.80}$Co$_{0.10}$Mn$_{0.10}$O$_{2.0}$ | AlN | | Yes | Yes | 450 | 300 | 50 | 182 | 96 |
| Example 61 | Li$_{1.0}$Ni$_{0.80}$Co$_{0.10}$Mn$_{0.10}$O$_{2.0}$ | BN | 0.1 | Yes | Yes | 30 | 300 | 50 | 182 | 97 |
| Example 62 | Li$_{1.0}$Ni$_{0.80}$Co$_{0.10}$Mn$_{0.10}$O$_{2.0}$ | Si$_3$N$_4$ | 5 | Yes | Yes | 300 | 300 | 50 | 183 | 94 |
| Example 63 | Li$_{1.0}$Ni$_{0.80}$Co$_{0.10}$Mn$_{0.10}$O$_{2.0}$ | Si$_3$N$_4$ | 5 | Yes | Yes | 300 | 300 | 50 | 181 | 95 |
| Comparative Example 1 | Li$_{1.0}$Ni$_{0.80}$Co$_{0.10}$Mn$_{0.10}$O$_{2.0}$ | No | | | | | | | 186 | 76 |
| Comparative Example 2 | Li$_{1.0}$Ni$_{0.83}$Co$_{0.14}$Al$_{0.03}$O$_{2.0}$ | No | | | | | | | 184 | 78 |
| Comparative Example 3 | Li$_{1.0}$Ni$_{0.80}$Co$_{0.10}$Mn$_{0.10}$O$_{2.0}$ | No | | | | | | | 159 | 77 |
| Comparative Example 4 | Li$_{1.0}$Ni$_{0.50}$Co$_{0.20}$Mn$_{0.30}$O$_{2.0}$ | No | | | | | | | 158 | 78 |
| Comparative Example 5 | Li$_{1.0}$Ni$_{0.34}$Co$_{0.33}$Mn$_{0.33}$O$_{2.0}$ | No | | | | | | | 157 | 79 |
| Comparative Example 6 | Li$_{1.0}$Ni$_{0.60}$Co$_{0.20}$Mn$_{0.20}$O$_{2.0}$ | No | | | | | | | 158 | 78 |
| Comparative Example 7 | LiCoO$_2$ | No | | | | | | | 157 | 79 |
| Comparative Example 8 | Li$_{1.0}$Ni$_{0.83}$Co$_{0.14}$Al$_{0.03}$O$_{2.0}$ | SiO$_2$ | 0.1 | Yes | | | | 50 | 186 | 81 |
| Comparative Example 9 | Li$_{1.0}$Ni$_{0.83}$Co$_{0.14}$Al$_{0.03}$O$_{2.0}$ | No | | | Yes | | 300 | | 186 | 79 |
| Comparative Example 10 | Li$_{1.0}$Ni$_{0.83}$Co$_{0.14}$Al$_{0.03}$O$_{2.0}$ | AlN | 0.1 | Yes | | 300 | | 50 | 186 | 80 |

As will be seen from the results in Table 1, in the batteries according to Examples, lithium complex oxides and highly thermal conductive compounds are included in the positive electrode active material. Consequently, the capacity retention after 500 cycles is increased, and the cycle characteristics are improved.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A positive electrode active material comprising:
a lithium complex oxide expressed by chemical formula (1);
a highly thermal conductive compound; and
graphene or multilayer graphene,
the chemical formula (1) being $$Li_xM1_yM2_{1-y}O_2 \quad (1)$$

where M1 is at least one metal selected from Ni, Co, and Mn, M2 is at least one metal selected from the group consisting of Al, Fe, Ti, Mg, Cu, Ga, Zn, Sn, B, V, Ca, and Sr, and x and y are numbers such that $0.05 \leq x \leq 1.2$ and $0.3 \leq y \leq 1$,
wherein the highly thermal conductive compound is at least one selected from the group consisting of AN, BN, $Si_3N_4$, ZrN, VN, $Cr_2N$, SiC, ZrC, $Mo_2C$, $Cr_3C_2$, $TiB_2$, $ZrB_2$, $VB_2$, and $NbB_2$,
wherein the lithium complex oxide is coated with a coating layer, and
the coating layer includes the highly thermal conductive compound.

2. The positive electrode active material according to claim 1, wherein
the highly thermal conductive compound has a content of 0.05 wt % to 10 wt % with respect to the lithium complex oxide.

3. The positive electrode active material according to claim 1, wherein
the coating layer additionally includes one or more of the graphene, and the multilayer graphene.

4. The positive electrode active material according to claim 1, wherein
the coating layer is partly coated with the graphene or the multilayer graphene.

5. The positive electrode active material according to claim 4, wherein
the coating layer including the highly thermal conductive compound has an average film thickness of 30 to 300 nm, and
the graphene or multilayer graphene has a film thickness of 50 to 500 nm.

6. The positive electrode active material according to claim 1, wherein
the highly thermal conductive compound has an average primary particle diameter of 10 to 500 nm.

7. A positive electrode comprising the positive electrode active material according to claim 1.

8. A lithium ion secondary battery comprising:
the positive electrode according to claim 7;
a negative electrode; and
an electrolyte.

9. The positive electrode active material according to claim 1, wherein
M1 is Co and optionally at least one metal selected from the group consisting of Ni and Mn.

10. The positive electrode active material according to claim 1, wherein
M1 is Co and Ni, and M2 is present and is Al, and
the graphene or multilayer graphene has a film thickness of 50 to 500 nm.

* * * * *